(12) United States Patent
Garceau et al.

(10) Patent No.: US 9,021,703 B2
(45) Date of Patent: May 5, 2015

(54) METHOD OF MANUFACTURING A ROOF BOW

(75) Inventors: Bernard F. Garceau, Vandalia, MI (US); Robert G. Chew, Edwardsburg, MI (US)

(73) Assignee: Norco Industries, Inc., Compton, CA (US)

( * ) Notice: Subject to any disclaimer, the term of this patent is extended or adjusted under 35 U.S.C. 154(b) by 621 days.

(21) Appl. No.: 13/274,437

(22) Filed: Oct. 17, 2011

(65) Prior Publication Data

US 2012/0091747 A1  Apr. 19, 2012

Related U.S. Application Data

(60) Provisional application No. 61/393,762, filed on Oct. 15, 2010.

(51) Int. Cl.
*B21D 53/88* (2006.01)
*B62D 25/06* (2006.01)
*B62D 31/00* (2006.01)

(52) U.S. Cl.
CPC ............... *B62D 25/06* (2013.01); *B62D 31/00* (2013.01)

(58) Field of Classification Search
CPC ............ B21D 53/88; B21K 1/74; B21K 7/14; B62D 21/02; B62D 30/0222; B62D 33/04; B62D 65/00; B60J 7/102
USPC ............. 29/897.2, 505, 521, 524, 524.1, 525, 29/525.01, 525.05, 525.06, 525.07; 296/104, 118
See application file for complete search history.

(56) References Cited

U.S. PATENT DOCUMENTS

| | | | |
|---|---|---|---|
| 1,093,657 A | 5/1914 | Sisson |
| 1,910,397 A | 5/1933 | Lewis |
| 1,947,682 A | 2/1934 | Swan |
| 2,138,084 A | 11/1938 | Bare |
| 2,205,640 A | 6/1940 | Wendt |
| 2,342,916 A | 2/1944 | Blaski |
| 2,368,405 A | 1/1945 | Black |
| 2,500,021 A | 3/1950 | Black |
| 2,645,521 A | 7/1953 | Judson |
| 2,697,990 A | 12/1954 | Parsons et al. |
| 3,022,106 A | 2/1962 | Black |
| 3,035,161 A | 5/1962 | Kalt |
| 3,205,002 A | 9/1965 | Seng |
| RE25,914 E | 11/1965 | Richter et al. |
| 3,226,153 A | 12/1965 | Haid |
| 3,700,277 A | 10/1972 | Montean, Jr. |
| 3,741,561 A | 6/1973 | Reidenbach |

(Continued)

OTHER PUBLICATIONS

Photograph of Bowed Rafter for Royal Cargo Trailer, purportedly published Jul. 2006.

(Continued)

*Primary Examiner* — Ryan J Walters
(74) *Attorney, Agent, or Firm* — Hahn, Loeser & Parks, LLP

(57) ABSTRACT

In one aspect of the present invention, a method is employed to fabricate a roof bow. A first body element and a second body element each have one or more tabs are both formed from a substrate. The tabs of the first body element are clinched to the second body element. The tabs of the second body element are clinched to the first body element. An upper cord is clinched to a top edge of the coupled body elements and a lower cord is clinched to a bottom edge of the coupled body elements to form the roof bow.

15 Claims, 18 Drawing Sheets

(56) References Cited

U.S. PATENT DOCUMENTS

| | | | |
|---|---|---|---|
| 3,921,320 A | 11/1975 | McWilliams | |
| 3,962,015 A | 6/1976 | Heimann | |
| 4,072,337 A | 2/1978 | Barker | |
| 4,089,148 A | 5/1978 | Oehmsen et al. | |
| 4,173,857 A | 11/1979 | Kosaka | |
| 4,623,189 A | 11/1986 | Stead | |
| 4,639,033 A | 1/1987 | Wheatley et al. | |
| 4,660,882 A | 4/1987 | Hensiek | |
| 4,854,633 A | 8/1989 | Kraft et al. | |
| 4,887,406 A | 12/1989 | Saia | |
| 4,902,065 A | 2/1990 | Thralls | |
| 5,000,507 A | 3/1991 | Baxter | |
| 5,325,632 A * | 7/1994 | Djavairian et al. | 49/502 |
| 5,423,587 A | 6/1995 | Ingram | |
| 5,429,408 A | 7/1995 | Henning et al. | |
| 5,443,295 A | 8/1995 | Moberly | |
| 5,540,016 A | 7/1996 | Clausen | |
| 5,655,347 A | 8/1997 | Mahieu | |
| 5,681,076 A | 10/1997 | Yoshii | |
| 5,706,752 A | 1/1998 | Menne, Jr. et al. | |
| 5,727,272 A | 3/1998 | Peter | |
| 5,769,486 A | 6/1998 | Novoa et al. | |
| 5,860,547 A | 1/1999 | Cozzolino et al. | |
| 6,073,993 A | 6/2000 | Iwatsuki et al. | |
| 6,135,532 A | 10/2000 | Martin | |
| 6,173,547 B1 | 1/2001 | Lipson | |
| 6,224,126 B1 | 5/2001 | Martain et al. | |
| 6,349,521 B1 | 2/2002 | McKeon et al. | |
| 6,360,491 B1 | 3/2002 | Ullman | |
| 6,494,525 B1 | 12/2002 | Blank | |
| 6,502,895 B2 | 1/2003 | Taylor | |
| 6,505,883 B1 | 1/2003 | Ehrlich | |
| 6,550,843 B2 | 4/2003 | Patelczyk | |
| 6,588,824 B2 | 7/2003 | Neubrand | |
| D489,650 S | 5/2004 | Garceau | |
| 6,842,920 B1 | 1/2005 | Branch, III | |
| 6,983,984 B2 | 1/2006 | Garceau | |
| 7,062,812 B1 | 6/2006 | Morris | |
| 7,134,711 B1 | 11/2006 | Yoder | |
| 7,171,788 B2 | 2/2007 | Bronner | |
| 7,210,727 B2 | 5/2007 | Stephenson et al. | |
| 7,261,366 B2 | 8/2007 | Garceau | |
| D603,103 S | 10/2009 | Ferrara et al. | |
| D608,261 S | 1/2010 | Furuhata et al. | |
| D633,421 S | 3/2011 | Peltola et al. | |
| 8,042,863 B2 | 10/2011 | Nydam | |
| 8,065,762 B1 | 11/2011 | Ewing | |
| D650,723 S | 12/2011 | Garceau et al. | |
| D657,719 S | 4/2012 | Garceau et al. | |
| 2001/0042993 A1 | 11/2001 | Patelczyk | |
| 2002/0116892 A1 | 8/2002 | Baranian | |
| 2003/0188499 A1 | 10/2003 | Bronner | |
| 2006/0101717 A1 | 5/2006 | Marocco | |
| 2006/0249977 A1 | 11/2006 | Stephenson et al. | |
| 2007/0063533 A1 | 3/2007 | Zehnder et al. | |
| 2007/0261319 A1 | 11/2007 | Fitzpatrick | |
| 2007/0261341 A1 | 11/2007 | Lockwood et al. | |
| 2008/0093031 A1 | 4/2008 | Alberti | |
| 2009/0206636 A1 | 8/2009 | Nydam | |
| 2010/0281632 A1 | 11/2010 | Meheen | |

OTHER PUBLICATIONS

Picture of Bowed Rafter, purportedly created Jul. 24, 2006, modified Jul. 26, 2006.

Rafter Drawing #API-1266, purportedly created Jan. 30, 2004, modified Aug. 10, 2007.

Roof Bow-High Arch Drawing & Photographs, purportedly redrawn Sep. 12, 1988 (3 pages).

\* cited by examiner

US 9,021,703 B2

METHOD OF MANUFACTURING A ROOF BOW

TECHNICAL FIELD

The subject invention relates generally to roof supports for recreational vehicles, and more particularly, to a curved roof bow to provide support for the ceiling and roof of such vehicles.

DISCUSSION OF ART

Vehicles such as trailers, utility trailers, utility vehicles, trucks, buses, horse trailers, semi trailers and other similar vehicles, including single axle, double axle and multi-axle vehicles use a structure to provide roof support, which is known as a roof bow. Roof bows often include a plurality of particular structural features to accommodate other components that are disposed proximate to the roof bow, including ventilation systems, electronics, wire harnesses, and the like. The manufacture and assembly of roof bows using conventional methods to include such structural features, however, is both costly and inefficient. Systems and methods are needed to overcome these and other deficiencies.

BRIEF DESCRIPTION

Trailers, utility trailers, utility vehicles, such as trucks, buses, horse trailers, semi trailers and other similar vehicles, including single axle, double axle and multi-axle vehicles. In one particular application, a curved roof bow is used to provide support for the ceiling and roof of such vehicles. It is to be appreciated, however, that the present exemplary embodiments are also amenable to other like applications.

In one aspect of the present invention, a method is employed to fabricate a roof bow. A first body element that includes one or more tabs and a second body element that has one or more tabs are both formed from a substrate. The tabs of the first body element are clinched to the second body element. The tabs of the second body element are clinched to the first body element. An upper chord is clinched to a top edge of the coupled body elements and a lower chord is clinched to a bottom edge of the coupled body elements to form the roof bow.

In another aspect, a method is used to fabricate a body element for a roof bow. A substrate is stamped to create a profile with a substantially arcuate shape, wherein a first side includes two tabs extending from the profile on a first side, the profile has a generally arcuate shape. One or more round and one or more square apertures are formed on the face of the profile.

In yet another aspect, a method is employed to form a roof bow. Means are employed to create a profile from a substrate and to form one or more holes in the profile. One or more tabs are formed in the profile, wherein the profile is coupled with another profile via the tabs.

Further, a method is employed to create a roof bow, which includes forming one or more web elements from a substrate. An upper chord and a lower chord are formed, wherein one or more web elements are placed between the upper chord and the lower chord. The one or more web elements are spaced between the upper chord and the lower chord. The one or more web elements are coupled to at least one of the upper chord and the lower chord.

DETAILED DESCRIPTION

The embodiments described herein relate to a curved roof bow that is employed to provide structure to a top portion of a vehicle. One advantage of the curved roof bow is that it provides additional headroom within the interior of the vehicle without modification to the height of sidewalls mounted thereto. The curved roof bow can be comprised of a plurality of subsections that are coupled together to form a unitary structure. Such subsections can be produced utilizing simpler and less expensive manufacturing operations than conventional monolithic roof bow designs. The curved roof bow can have different lengths and radii of curvature to accommodate disparate design parameters as needed. The foregoing and other aspects will become apparent from the following detailed description of the invention when considered in conjunction with the accompanying drawing figures.

Figure 1:
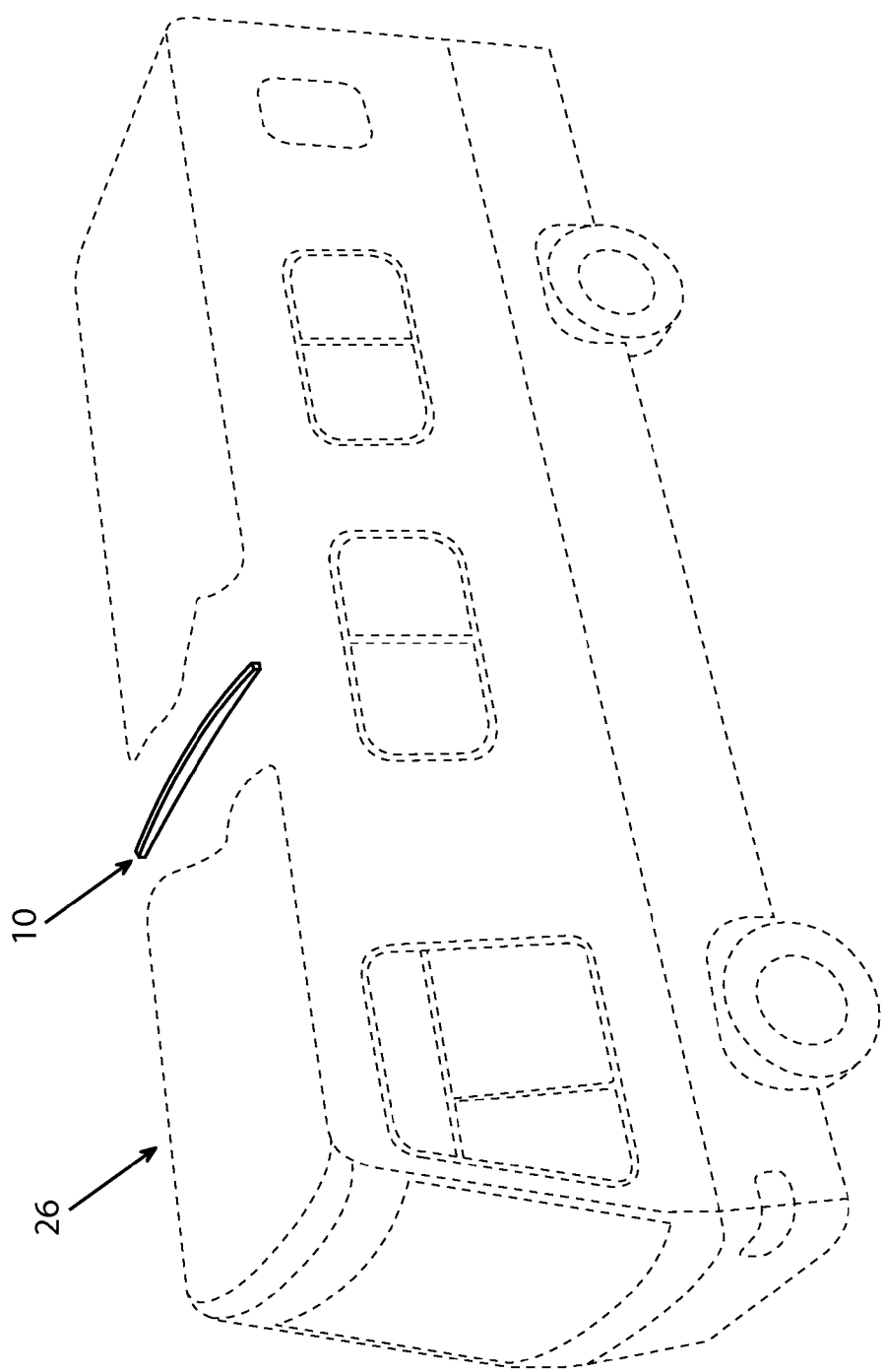
FIG. 1 is a perspective view of a roof bow installed in an exemplary vehicle, in accordance with an aspect of the subject invention.

FIG. 1 illustrates a particular application of the roof bow 100 providing structural support for a ceiling and roof of a vehicle 26. It is to be appreciated, however, the embodiments herein contemplate utilizing the curved roof bow 100 with substantially any type of vehicle including recreational vehicles, trailers, utility trailers, utility vehicles, parcel trucks, buses, horse trailers, semi-trailers and other similar vehicles, including single axle, double axles and multi-axles vehicles. Although only a single roof bow 100 is illustrated, it will be appreciated by one skilled in the art that a plurality of roof bows 10 can be employed as desired. In one embodiment, the curved roof bow 100 is formed by securing two or more sections together to form a finished product.

Figure 2:
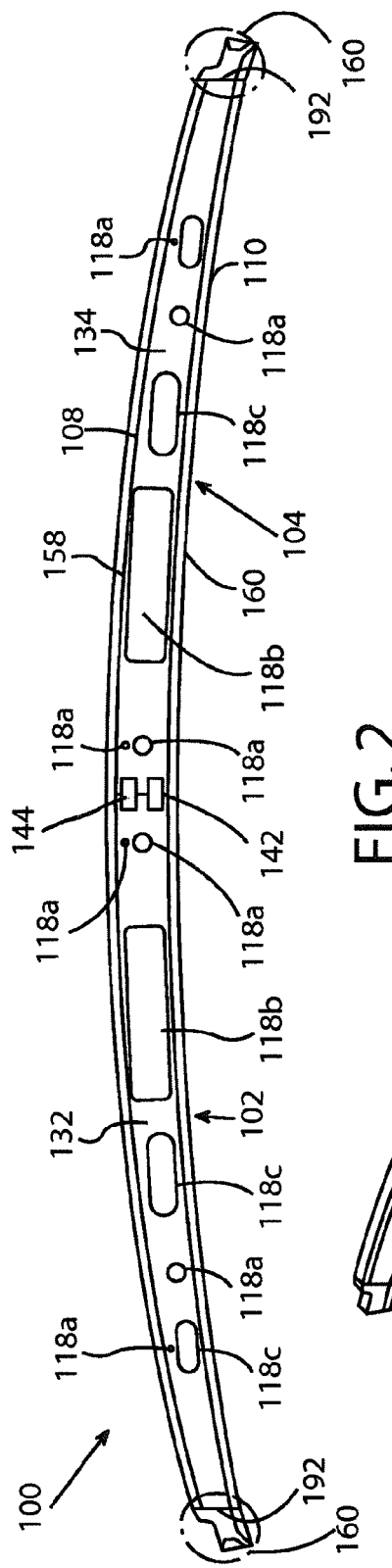
FIG. 2 is an elevational front view of an exemplary roof bow, in accordance with an aspect of the subject invention.

FIG. 2 illustrates a front elevation view of a first embodiment of a roof bow 100 that is comprised of a first subsection 102 and a second subsection 104. The subsections 102 and 104 includes a body element 132 and a body element 134 respectively, which are disposed between a upper chord 108 and an lower chord 110. The body elements 132, 134 can be formed from a substrate or other manufacturing operation to create a particular profile. In one example, a first side, located near the inner portion of the roof bow 100 can be wider than a second side located opposite the first side that is distal the inner portion, to provide a tapered profile. In addition, the profile can have an arcuate shape that curves generally downward from the first side to the second side. The roof bow 100 can be comprised of substantially any number of subsections from 1 to 100. In one example, the roof bow 100 is comprised of 2 subsections. In another example, the roof bow 100 is comprised of 13.

A substrate such as sheet metal can be employed for creation of the body elements 132, 134, which can be formed from one or more of aluminum, brass, copper, steel, stainless steel, tin, nickel, and titanium. These materials can be vary in thicknesses (e.g., between 30 gauge to 8 gauge) and can be dependent on different applications for which the roof bow is employed. Alternatively or in addition, the chords 108, 110 or subsections 102, 104, and like elements discussed herein can be created using disparate materials formed from substantially any manufacturing process, without deviating from the scope of the present invention. For example, the roof bow 100 can be comprised of aluminum, other thin gauge metals, or any of a plurality of other materials. Such materials can be formed in a die, molded, extruded, stamped, and/or withstand substantially any manufacturing process. Moreover, the materials used to construct the roof bow 100 can optionally be protected from deterioration by galvanization, painting or other corrosion protection means.

In one example, the body elements 132, 134 are each stamped from an aluminum sheet to create a desired profile, form one or more apertures 118 at various locations therein, form one or more tabs 142, 144, and/or one or more features to accommodate other elements that may pass through the profile. The ends of the body elements 132 and 134 can further have particular cut-outs to accommodate various structures that are expected to reside directly adjacent to the roof bow 100. In this embodiment, cut-outs 192 and 194 are features designed to accommodate beams or similar structural elements used to construct the vehicle in which the roof bow is disposed. In another example, the body elements 132, 134 are stamped from a substrate wherein other processes are employed to create other features. For instance, the apertures 118 can be drilled or otherwise cut from the body elements 132, 134. Alternatively or in addition, the tabs 142, 144 can be welded, adhered, or otherwise coupled to the body elements 132, 134 subsequent to a stamping process to create the profile. In yet another aspect, a plurality of stamping operations can occur in sequence to provide particular profiles, apertures, tabs, etc.

The sides of the body elements 132, 134 comprise end caps or side flanges 160. The end caps 160 can extend in the same direction as the top flange 152 and the bottom flange 156. In an embodiment, the end caps 160 are rectangular. However, it is contemplated that end caps 160 can be any of a plurality of shapes without deviating from the scope of the present invention. It is contemplated that the end caps 160 can optionally be attached to the top flange 152 and/or the bottom flange 156. The end caps 160 help prevent compression of the ends of the curved roof bow under vertical loads, by providing support for the ends of the top flange 152 and bottom flange 156. The end caps can be independently coupled to the body elements 132, 134 and/or bent around from either the top chord 108 or bottom chord 110 as appropriate.

The apertures 118 can have substantially any shape, size, or location. In one example, the apertures are employed as clearance holes for marker lights, wiring, ducting, stay lasts, and/or stiffeners. In this manner, structural, electrical, control, and other elements can be allowed to pass through the roof bow 100 to fulfill other requirements for operation and production of the vehicle 26. In an embodiment, one or more of the apertures 118a-118c have embossments, which can extend away from a face of a body element at an angle. In one embodiment, the embossment extends at an angle forwardly and inwardly, i.e., toward the center of the aperture 118. In another embodiment, the embossment extends vertically and is parallel to the face of a body element. In yet another embodiment, the embossment rolls rearwardly, thus eliminating sharp edges about the aperture perimeter. This particular type of rolled embossment can provide additional stiffness to the curved roof bow and presents a smooth edge to prevent damage to any wires passing through the apertures. Further embodiments for the rolled embossments providing a smooth aperture edge are contemplated, and can be utilized without deviating from the scope of the present invention. It is also contemplated that the embossments about the apertures can be eliminated entirely.

The apertures can be categorized into three types, round apertures 118a, rectangular apertures 118b, and oval apertures 118c. The round apertures 118a can provide clearance for marker lights when the curved roof bow is installed at the rear of the vehicle. The oval apertures 118b can be used for stay lasts. The oval apertures 118c can be used for wiring. The rectangular apertures 118b are typically used for ducting. Regardless of the type, the apertures 118 can have rolled edges or other embossments to provide a smoother perimeter edge rather than a sharp edge. Such a smooth edge is advantageous when wiring or other material is pulled through the apertures 118. It should be understood that the aforementioned reference to particular apertures 118a-118c in conjunction with particular functions is exemplary. The number and shape of the apertures 118 and the function of any particular aperture can be adapted for particular needs of the vehicle 26 without deviating from the scope of the present invention.

The upper chord 108 can be attached to a top edge of the body elements 132, 134 and the lower chord 110 can be attached to a bottom edge of the body elements 132, 134. In another embodiment, the chords 108, 110 are placed at suitable locations proximate the first and second edges of the body elements 132, 134 and attached thereto. Next, the body elements 132, 134 are coupled together at the widest portions.

Alternatively, the body elements 132, 134 are first coupled together at the widest portions before the chords are attached. It is to be appreciated, however, that any order and type of coupling of these elements is contemplated within the scope of this invention.

To couple the body elements 132, 134, two tabs 142, 144 extend from the inner portion of the body element 134 to overlap and interface with a first face of the portion of the body element 132. It is to be appreciated that symmetrical tabs (not shown) can also extend from the inner portion of the body element 132 to interface with a second face of the body element 134, which is opposite the first face. For simplicity, the discussion herein will relate to the tabs 142, 144 as they couple to the body element 134. It is to be appreciated, however, that such discussion applies equally to the corresponding tab arrangement to couple to the body element 132. The upper chord 108 and the lower chord 110 can be attached to the body elements 132, 134 using the same coupling techniques described herein. The use of tabs to couple together body elements to other body element and to couple chords thereto applies equally to embodiments within the scope of this invention.

In one exemplary aspect, the tabs 142, 144 are clinched to the body element 132 in the area underneath each respective tab. Clinching can be accomplished via a punching process that indents each tab 142, 144 and the body element 132 to join them together at the punch location. More particularly, material can be drawn from each tab 142, 144 and the body element 132 and allowed to flow into a flared perimeter to lock each tab 142, 144 and body element 132 at the punch location, for example, using a TOG-L-LOC. In another arrangement, one or more holes can be formed (e.g., drilling, punching, etc.) into each tab 142, 144, wherein a fastening element is employed to join the tabs 142, 144 to the body element 132 via the holes. The fastening element can be a screw, bolt, rivet or other joining means known in the art. In yet another arrangement, the tabs 142, 144 are coupled to the body element 132 via an adhesive, epoxy, or weld operation.

Figure 19:
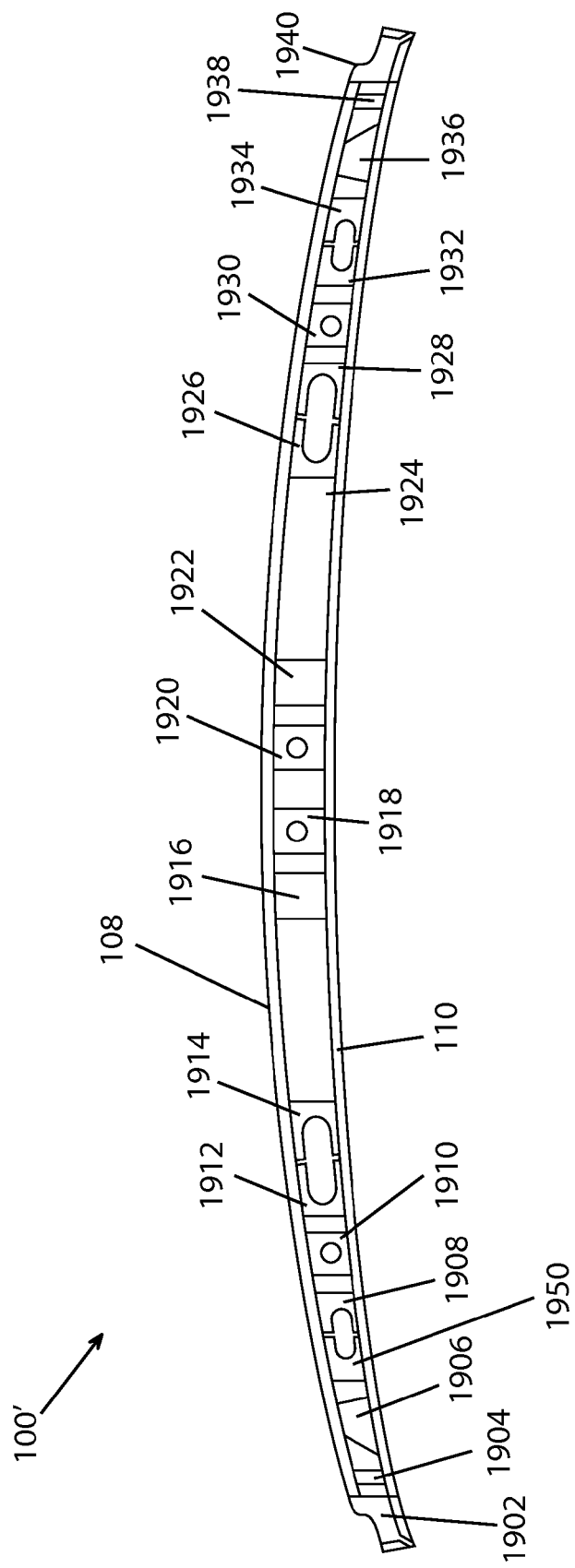
FIG. 19 is an elevational front view of an exemplary roof bow, in accordance with an aspect of the subject invention.

In another exemplary aspect, as shown in FIG. 19, a roof bow 100' does not include body elements that have tabs. Instead, a plurality of web elements 1902, 1904, 1906, 1908, 1910, 1912, 1914, 1916, 1918, 1920, 1922, 1924, 1926, 1928, 1930, 1932, 1934, 1936, 1938, and 1940 are used to couple the chords 108, 110 together at various spaced locations along the length of the roof bow 100'. The web elements 1902-1940 can be spaced at any suitable distance from each other along the length of the roof bow 100'. In this manner, substantially any sized aperture can be formed at substantially any location between the chords 108,110. Moreover, the web elements 1902-1940 can be made to desired sizes and shapes based on any number of factors including available tooling for such fabrication, different design parameters, available stock, etc. In addition, the design of the roof bow 100' can be changed "on the fly" to create apertures at particular locations that may be required in view of modifications to other design parameters including location of various adjacent structures, wiring, ducts, etc.

It is to be appreciated that apertures within the roof bow 100' can be formed via the same or similar means as described herein as suitable. Thus, instead of the formation of an entire oval aperture, a semi-oval shaped aperture can be formed in web elements 1926, 1928. The web elements can be in any shape including a polygon, concave polygon, a constructible polygon, a convex polygon, a cyclic polygon, an equiangular polygon, an equilateral polygon, a regular polygon, a Penrose tile, a polydrafter, a balbis, a henagon, a digon, a triangle, an acute triangle, an anticomplementary triangle, an equilateral triangle, an excentral triangle, an isosceles triangle, a medial triangle, an obtuse triangle, a rational triangle, a right triangle, a 30-60-90 triangle, an isosceles right triangle, a Kepler triangle, a scalene triangle, a quadrilateral, a cyclic quadrilateral, a tetrachord, a kite, a parallelogram, a rhombus, an equilateral parallelogram, a Lozenge, a rhomboid, a rectangle, a square, a regular quadrilateral, a rhombus, a tangential quadrilateral, a trapezoid, an isosceles, a trapezoid, a pentagon, a regular pentagon, a hexagon, a Lemoine hexagon, a heptagon, an octagon, a regular octagon, a nonagon, a decagon, a regular decagon, a hendecagon, a dodecagon, hexadecagon, icosagon, star, star polygon, hexagram, heptagram, octagram, a decagram, a pentagram, a 3-dimensional variation of these shapes and any combination thereof. Similarly, the elements can be connected to the top and bottom rails at any location within each element.

Figure 20:
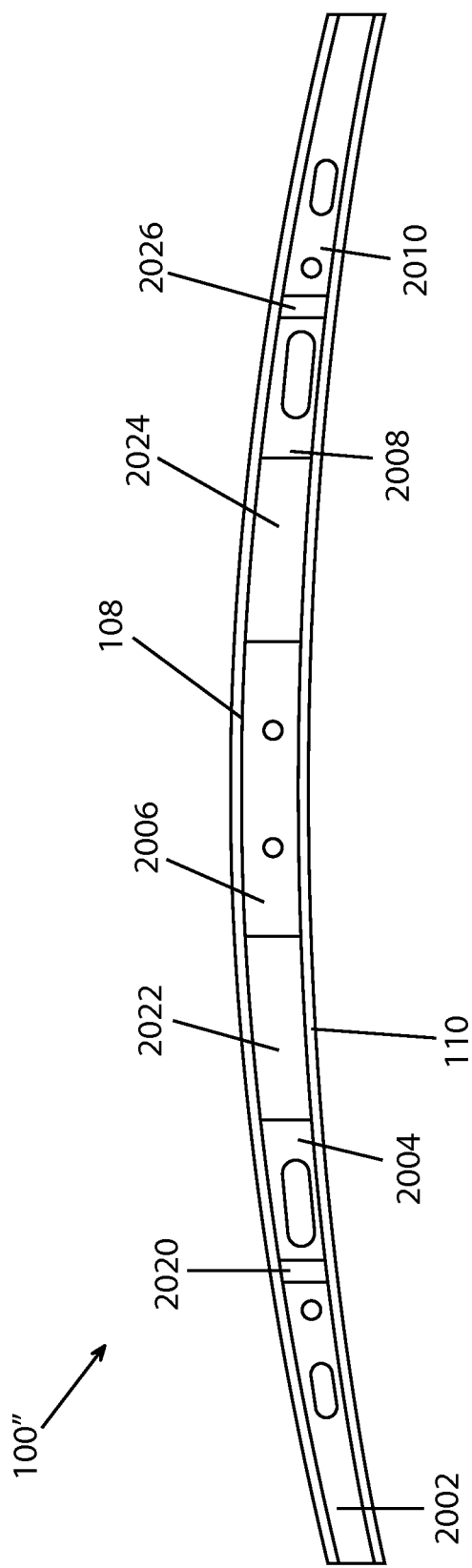
FIG. 20 is an elevational front view of an exemplary roof bow, in accordance with an aspect of the subject invention.

During assembly the upper and lower chords 108, 110 can be laid out wherein each of the body elements are placed as particular locations therebetween. Subsequently, a clinching device can be employed to couple each of the web elements 1902-1940 to the top and bottom chords 108, 110 via the top and bottom edges of the web elements. In one example, the web elements are coupled to only one chord 108 or 110. Alternatively or in addition, the web elements 1902-1940 do not extend the entire distance between the spacing of the chords 108 and 110. Yet another embodiment 100" illustrated in FIG. 20, shows an alternate configuration using five web elements 2002, 2004, 2006,2008, and 2010. The web elements 2002 and 2004 and spaced apart via a gap 2020. The web elements 2004 and 2006 and spaced apart via a gap 2022.

The web elements 2006 and 2008 are spaced apart via a gap 2024 and the web elements 2008 and 2010 are spaced apart via a gap 2026. Similar to the roof bow 100', the roof bow 100" does not tabs to couple together other body elements disposed between the chords 108, 110. Instead, the web elements 2002-2010 are suitably spaced to provide adequate structural integrity and proper aperture placement. Moreover, the use of smaller web elements can lower costs as some of these components can be scrap or other thrown away material from other operation or process. In sum, the roof bow 100' provides a degree of flexibility of design and implementation for creation of each roof bow 100'.

Figure 3:
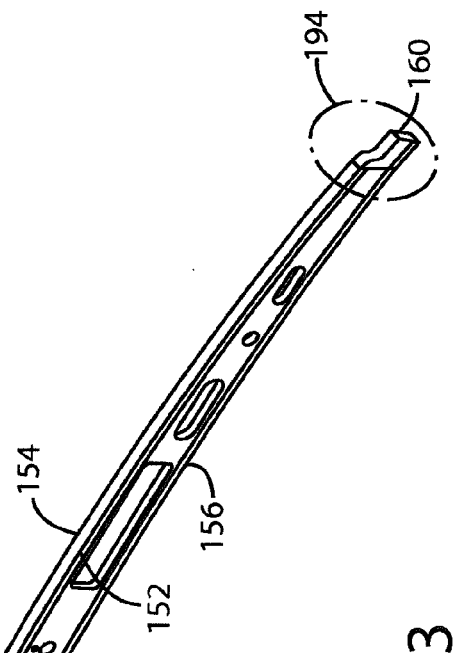
FIG. 3 is a perspective view of a roof bow set forth in FIG. 2, in accordance with an aspect of the subject invention.

The upper chord 108 and the lower chord 110 are disposed against the top and bottom edges of the body elements 132 and 134, respectively. In one aspect, the chords 108, 110 are made from an extruded material, such as aluminum. This extrusion can have a T-shaped profile. The upper chord 108 can include a lower element 158 and a flange 152 and a flange 154 that extend substantially perpendicular from the lower element 158, as shown in FIG. 3. Similarly, the lower chord 110 can have an upper element 160 that is adjacent a flange 156. The lower element 158 and the upper element 160 can be utilized to facilitate the attachment of the body elements 132, 134 therewith.

Figure 4:
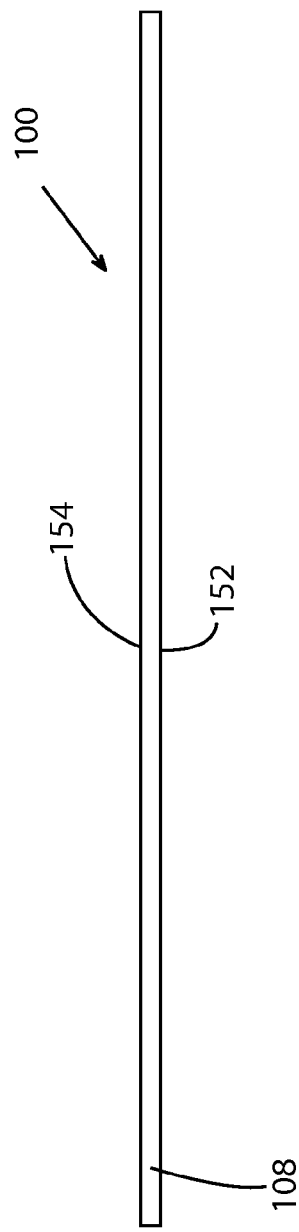
FIG. 4 is a top plan view of the roof bow set forth in FIGS. 2 and 3, in accordance with an aspect of the subject invention.
Figure 5:
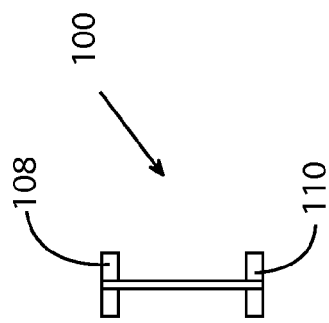
FIG. 5 is an end view of the roof bow set forth in FIGS. 2, 3 and 4, in accordance with an aspect of the subject invention.

For example, the lower element 158 can be clinched to the top of edge of the body elements 132 and 134. In addition, the upper element 160 can be clinched to the bottom edge of the body elements 132, 134. In this manner, the chords can provide structural support for the top and bottom of the roof bow 100. The chords 108 and 110 can further receive vertical embossments that allow the chords to be bend or otherwise fashioned has desired with while minimizing a weakening of the structural integrity of the material. FIG. 4 shows an overhead view of the roof bow 100 to illustrate the upper chord 108. In FIG. 5 shows an end view of the roof bow 100 that shows the T-shaped profile of the upper and lower chords 108, 110.

Figure 6:
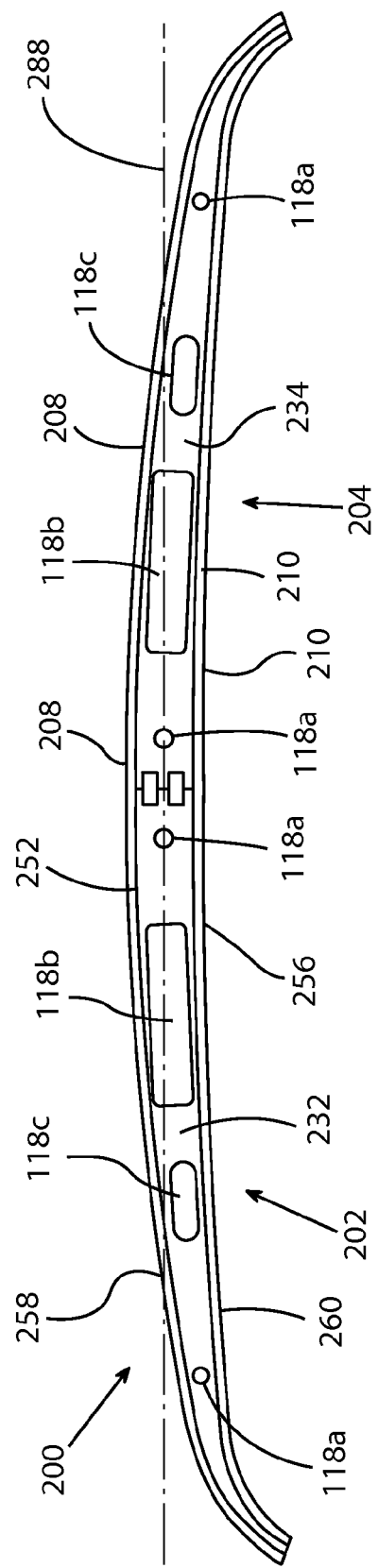
FIG. 6 is a front elevation view of an exemplary embodiment of a roof bow, in accordance with an aspect of the subject invention.

FIGS. 6-9 show elevation views of disparate embodiments of the roof bow 100 but do not include additional perspective top or end views. FIG. 6 illustrates a second embodiment of a roof bow 200 which has a subsection 202 and a subsection 204 with a profile that differs from that set forth above in FIGS. 2-5. In this embodiment, the body elements 232 and 234 respectively curve sharply downward at the ends away from the coupling point which is located substantially along a center line 288. The body element 232 is coupled to the body element 234 as set forth above the clinching or other means. An upper cord 208 and a lower 210 are also coupled to the body elements 232 and 234 utilizing the same or similar methods as discussed above. The lower element 258 and the upper element 260 are likewise utilized to couple the upper chord 208 and lower chord 210 to the body elements respectively. The disparate profile can be formed to accommodate structural or other members that are located in particular locations of a vehicle which may vary from model to model.

Figure 7:
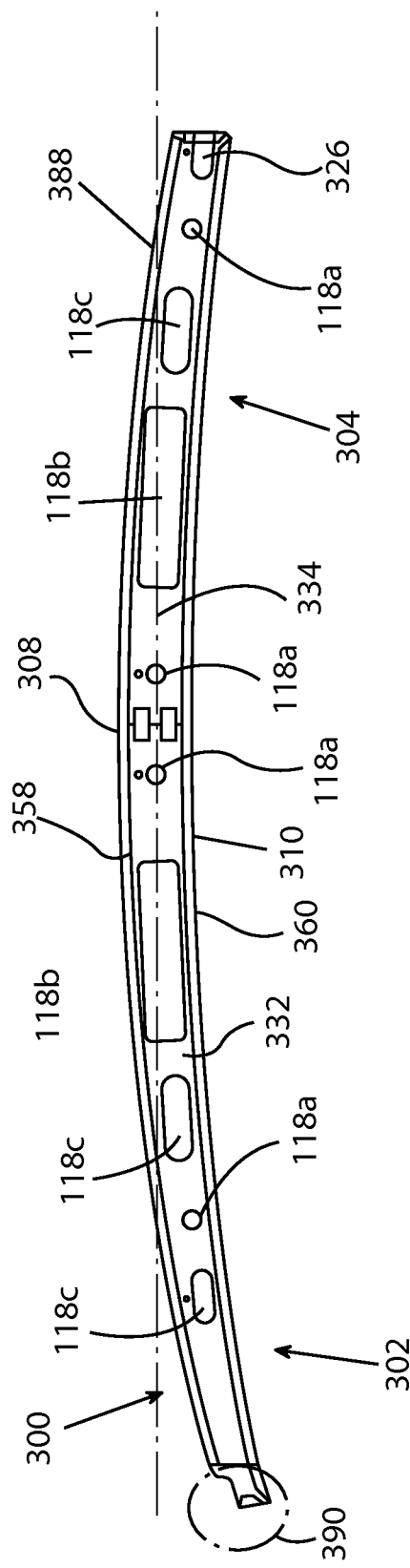
FIG. 7 is a front elevation view of an exemplary embodiment of a roof bow, in accordance with an aspect of the subject invention.

FIG. 7 illustrates a third embodiment of a roof bow 300 which includes a subsection 302 and a subsection 302 or a subsection 304 that are coupled together at the inner edges of both body element 332 and a body element 334. In this embodiment 300, the body elements 332 and 334 are not coupled along a center line 388 of the length of the roof bow 300. Instead, in this embodiment, the body element 332 is approximately twice the length of the body element 334. An additional difference is a feature located on the right-hand side of the roof bow which is a notch 326 that has utilize conduit wiring or other structural member. A feature 390 on the opposite end of the body element 332 is cut-out to accommodate the same. Chords 308 and 310 coupled to the body elements 332 and 334 via a lower member 358 and a upper member 368 respectively via the methods discussed herein.

Figure 8:
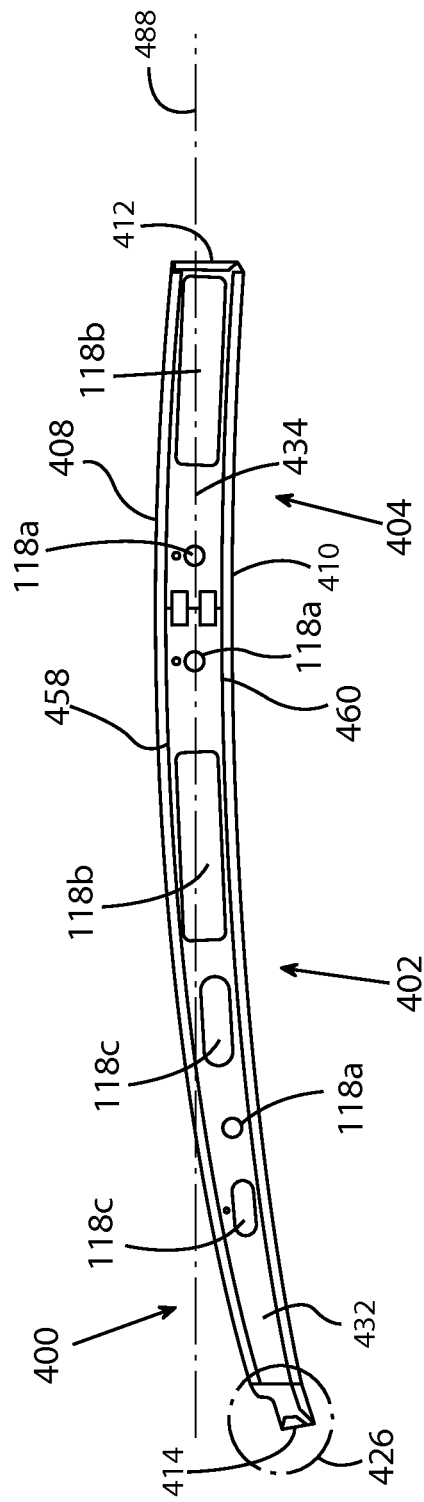
FIG. 8 is a front elevation view of an exemplary embodiment of a roof bow, in accordance with an aspect of the subject invention.

A fourth embodiment of a roof bow 400 is set forth in FIG. 8. The roof bow 400 includes subsections 402 and 404, wherein 402 is approximately three times the length of the subsection 402. The subsection 402 includes that body member 432 and the subsection 4 includes the body member 434. An upper chord 408 is coupled to the top edge of both body elements 432 and 434. A lower chord for 10 is coupled to the lower edges of the body elements 432 and 434. In addition a chord 412 is coupled to the outside edge of the body element 434 and a chord 414 is coupled to an outside edge of the body element 432. The addition of the chords 412 and 414 can provide additional structural support and/or be utilized to protect the body elements 434 and 432 from damage or deterioration in use.

Figure 9:
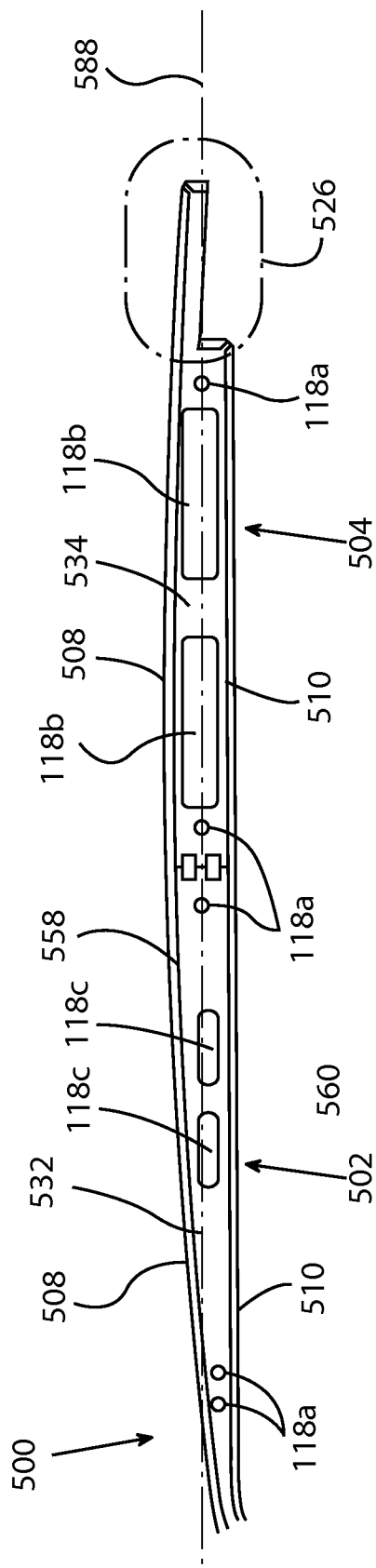
FIG. 9 is a front elevation view of an of an exemplary embodiment of a roof bow, in accordance with an aspect of the subject invention.

A fifth embodiment of a roof bow 500 is set forth in FIG. 9. The roof bow 500 includes subsections 502 and 504 which each include body elements 532 and 534 respectively. The body elements are 532 and 534 are coupled together substantially near a center line 588 via the methods described herein. An upper chord 508 is used to couple to the upper edge of the body elements 532 and 534. Similarly, a lower chord 510 is utilized to couple to the lower edge of the body elements 532 and 534. A feature 526 provides a cut-out at the outer end of the body element 534 to accommodate an adjacent structural member.

In one aspect, lower and upper chords 108 and 110 each include a channel to accommodate respective edges of the subsections 102, 104. In another example, the chords 108, 110 are coupled to the body elements via other fastening methods including clinching, fastening elements, adhesive and and/or weld operations. The subsections 102, 104 can be coupled together at a location between the chords 108, 110 to form a unitary structure. In one embodiment, the subsections are coupled together using one or more fastening devices such as a screw, rivet and/or via a clinching, a joining or a punching operation. Tabs or other protrusions can be employed for this purpose to provide surfaces to facilitate the coupling operation. Thus, the roof bow 1002 can include five main components: two subsections, two chords and a coupling element.

Figure 10:
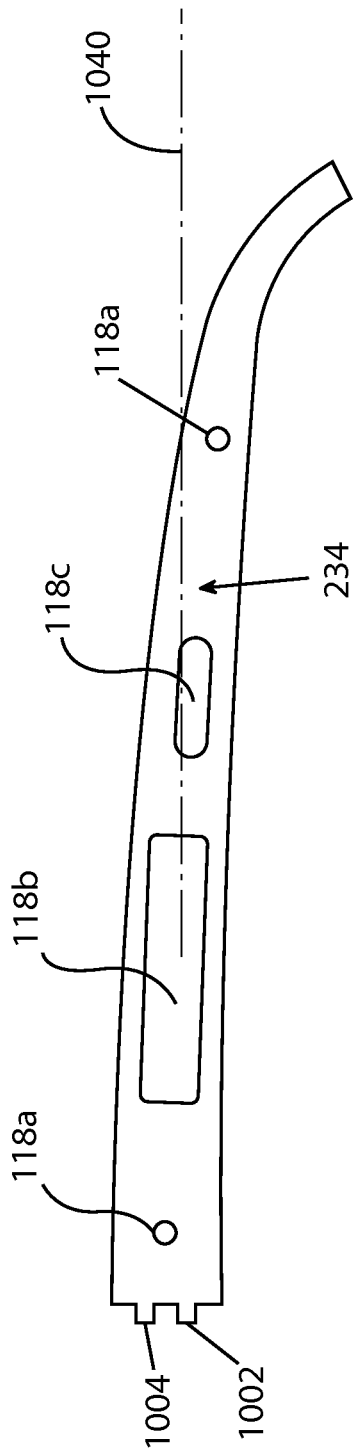
FIG. 10 is a front elevation view of a body element that can be employed with the exemplary roof bow in FIG. 6, in accordance with an aspect of the subject invention.

FIG. 10 illustrates an exemplary embodiment of the body element 234, which can be employed with a roof bows 100-500 discussed above. In one particular embodiment, the body element 234 is a member of the roof bow 200 set forth in FIG. 6. The body element 234, similar to all body elements discussed herein, can be formed from a substrate with a desired shape and profile and including one or more features. For example, the profile of the body element can be tapered from a first side to a second side, wherein the first side is utilized in the interior of the roof bow and the second side is utilized on the outside of the roof bow. In addition, the formation of the body element can include the formation of additional features such as one or more tabs for coupling and one or more apertures to allow structural, electrical and other external conduit to be disposed there through.

In this embodiment, the first side of the body element 234 includes two tabs 1002, 1004 which are utilized to couple the body element 234 two another body element such as 234 or other profile as desired. The body element 234 has four apertures that are formed therein, a two circular apertures one 118a, a rectangular aperture 118b and oval aperture 118c. The aperture are disposed wherein the first circular aperture is formed near the first side and the second circular aperture 118a is formed near the second side wherein the rectangular aperture 118b and the oval aperture 118c are disposed there between.

The second side of the body element 234 is tapered relative to the first side and further includes a radius wherein the end is bent at a desired curvature to an end point. The radius of curvature and angle can be modified such that the second side bends at an angle of 0-90° relative to an axis 1040, which is substantially identical to a center line of the body element 234. It is to be appreciated that the body element 234 can be coupled to another body element 234 with an identical profile wherein the tabs 1002 are placed on opposite of a profile in a complementary configuration. Once the body elements are disposed as such, a clinching operation can be utilized to couple the tabs to the opposite body element via clinching or similar operation.

Figure 11:
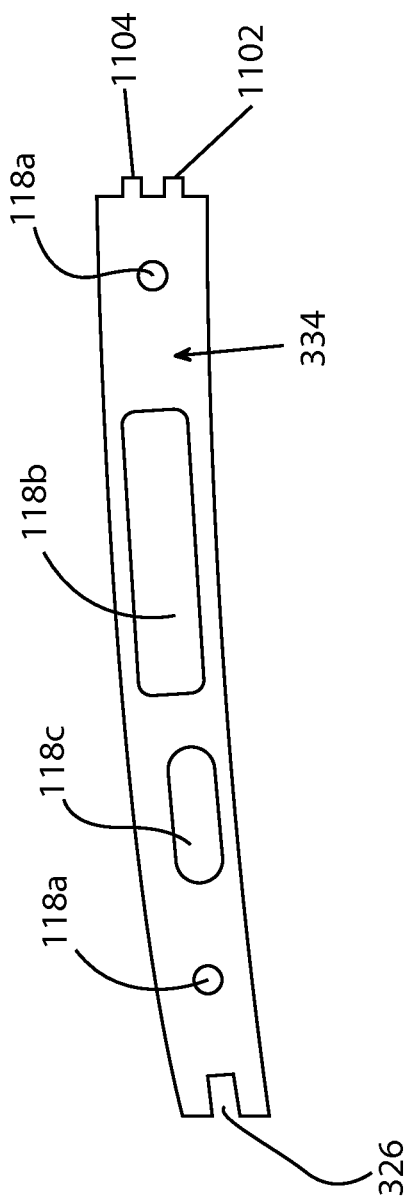
FIG. 11 is a front elevation view of a body element that can be employed with the exemplary roof bow in FIG. 7, in accordance with an aspect of the subject invention.

FIG. 11 illustrates a front elevation view of the body element 334 that is utilized with the roof bow 300 set forth in FIG. 7. The body element 334 can be formed from a substrate similar to the body element 234 described above. In one example, the roof bow is stamped from a portion of sheet metal to create the profile of the body element 334 as well as the apertures 118, 118a, 118b, 118c, the tabs 1102, 1104 and a feature 326. The tabs 1102 can be utilized to couple the body element 334 to another body element in order to form a roof bow. The feature 326 is a cut out that has a particular radius in order to accommodate one or more external elements to be disposed through the body element 334. The body element 334 has a generally accurate shape which tapers slightly from a first side containing the tabs 1102 to the second side containing the cut out 326.

Figure 12:
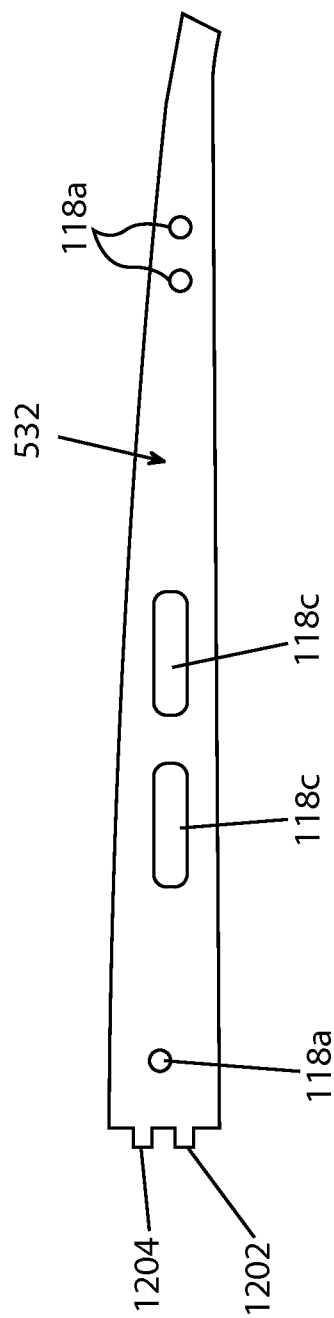
FIG. 12 is a front elevation view of a body element that can be used with the exemplary roof bow in FIG. 9, in accordance with an aspect of the subject invention.
Figure 13:
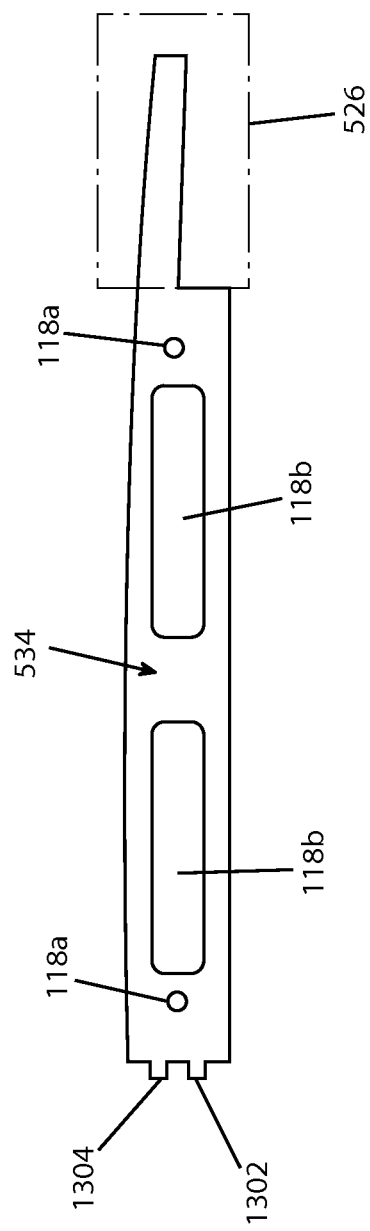
FIG. 13 is a front elevation view of a body element that can be employed with the roof bow of FIG. 9, in accordance with an aspect of the subject invention.

FIG. 12 is an elevation view of the body element 532 utilized with the roof bow 500 set forth in FIG. 9. The body element 532 that includes three circle apertures 118a and two oval apertures 118c. In addition, the body element 532 includes two tabs 1202, 1204 that are utilized to couple the body element 532 to another body element, such as the body element 534 set forth in FIG. 13. The body element 534 includes tabs 1302, 1304 which can be utilized to couple the body element 534 to the body element 532 via clinching operation, a one or more fasteners, via an adhesive, and/or via a weld operation. The body element 534 includes two apertures 118*a* and two apertures 118*b* with a feature 526 at a second side of the body element 534. The feature 526 as shown is a step that allows another element to be placed adjacent to through the roof bow profile such as electrical, structural or other elements commonly found in a vehicle.

Figure 14:
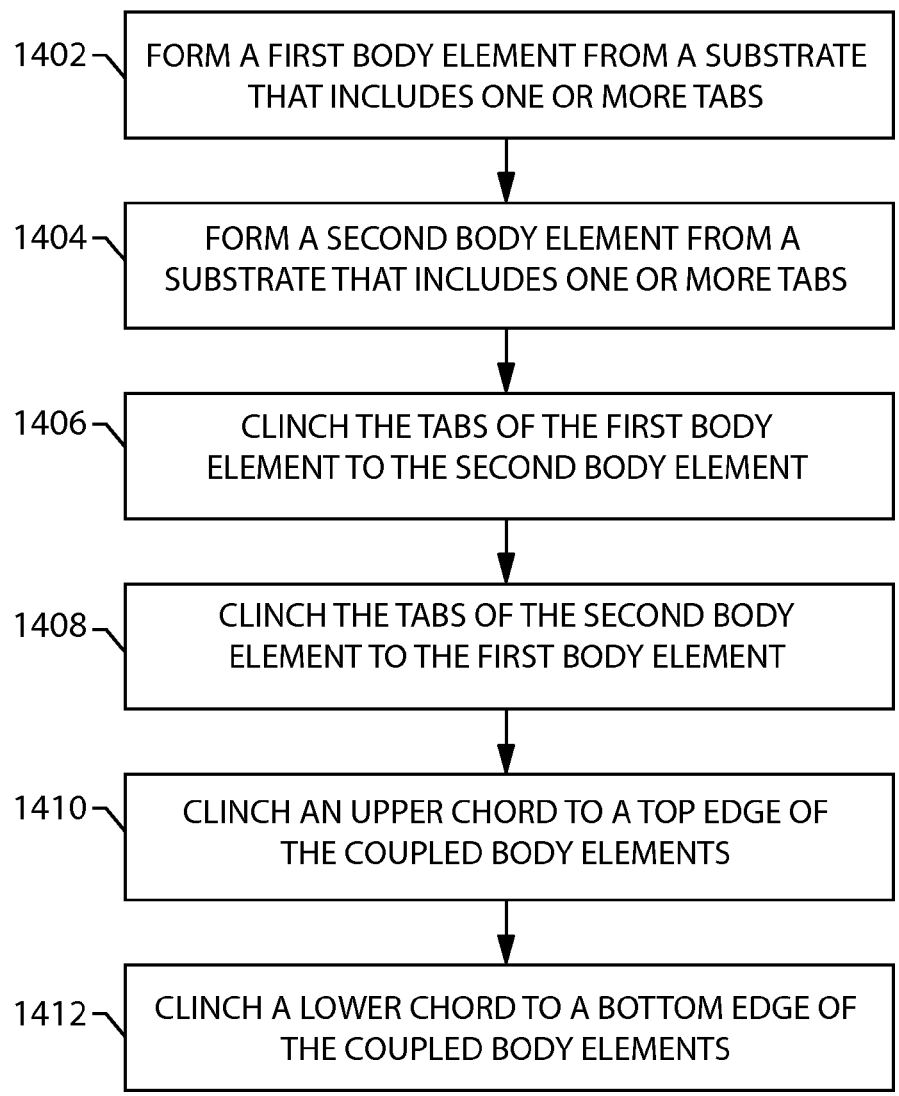
FIG. 14 is a method to fabricate a roof bow, in accordance with an aspect of the subject invention.

FIG. 14 illustrates a methodology to create a roof bow. At step 1402, a first section of substrate is used to form a first body element that includes one or more tabs. At step 1402, a second section of substrate is utilized to form a second body element that includes one or more tabs. At 1406, the tabs are the first body element are clinched to the second body element and at 1408 the tabs a of the second body element are clinched to the first body element. An upper cord is clinched to a top edge of the coupled body elements at 1410. Similarly, at 1412, a lower cord is clinched to a bottom edge of the coupled body elements.

FIG. 14 illustrates a methodology 1400 to create a roof bow. At step 1402, a first section of substrate is used to form a first body element that includes one or more tabs. At step 1402, a second section of substrate is utilized to form a second body element that includes one or more tabs. At 1406, the tabs are the first body element are clinched to the second body element and at 1408 the tabs a of the second body element are clinched to the first body element. An upper cord is clinched to a top edge of the coupled body elements at 1410. Similarly, at 1412, a lower cord is clinched to a bottom edge of the coupled body elements.

Figure 15:
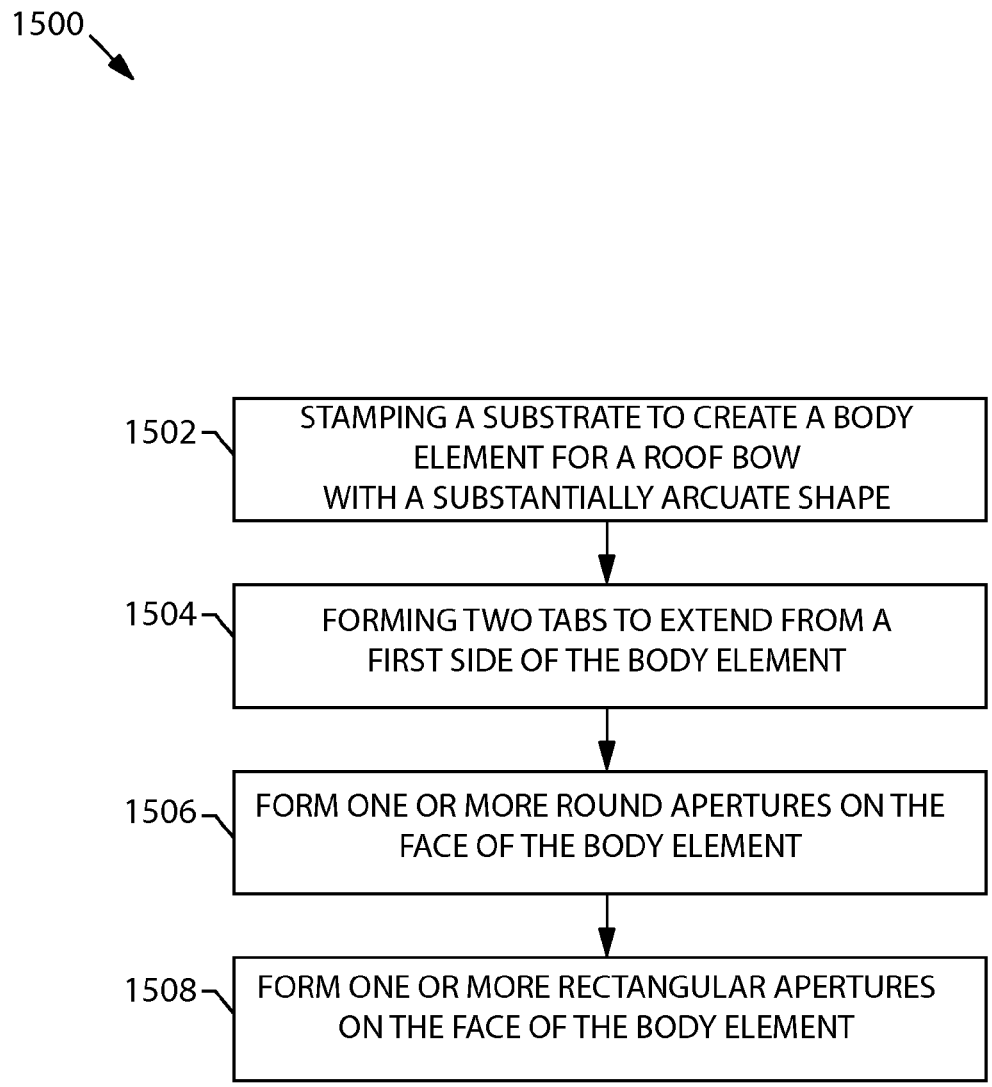
FIG. 15 is a method to fabricate a body element for a roof bow, in accordance with an aspect of the subject invention.

FIG. 15 illustrates a methodology 1500 to create a body element for a roof bow. At 1502, a substrate is stamped to create a profile with a substantially arcuate shape. A first side includes two tabs extending from the profile on a first side, wherein the profile has a generally arcuate shape. At 1504, one or more round apertures are formed on the face of the profile. At 1506, one or more rectangular apertures are formed on the face of the profile.

Figure 16:
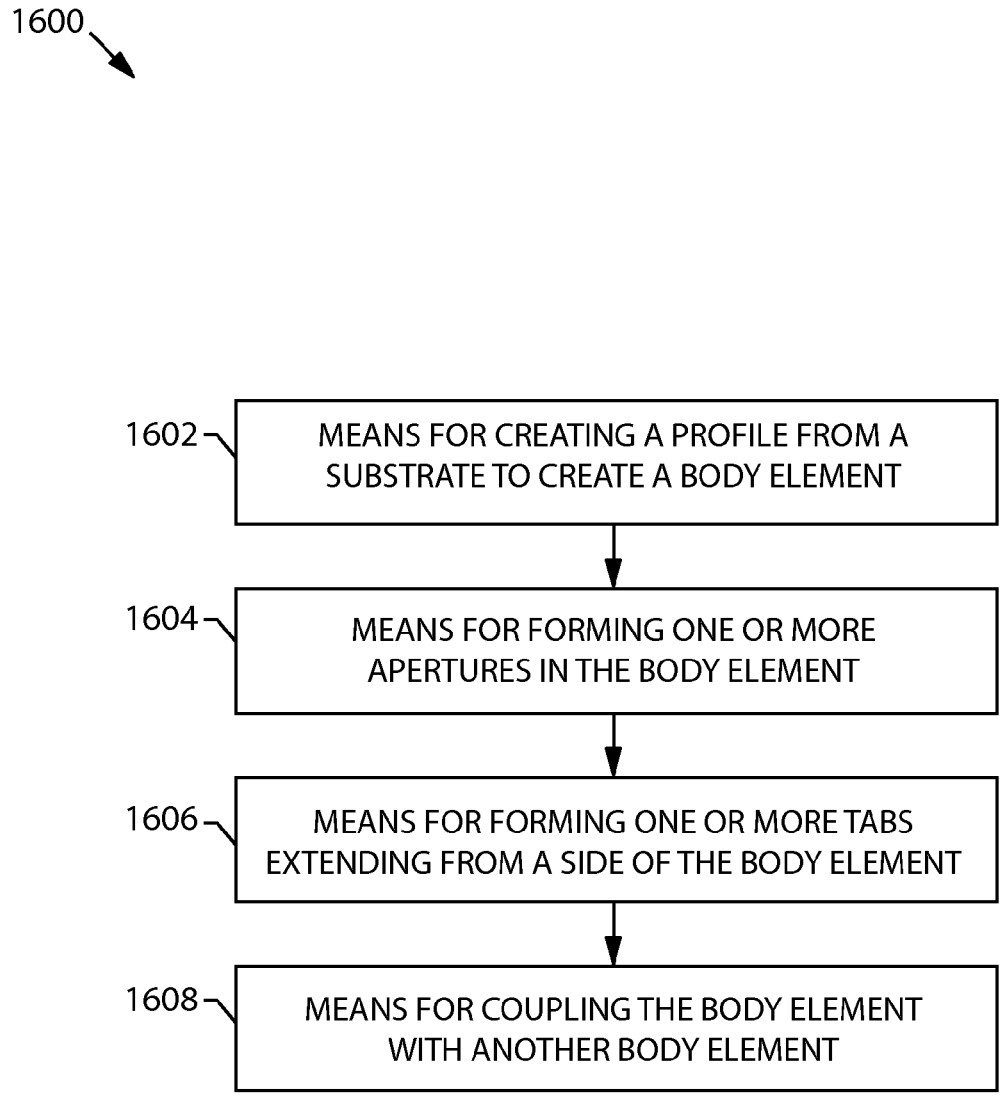
FIG. 16 is an exemplary method to form a roof bow, in accordance with an aspect of the subject invention.

FIG. 16 illustrates a methodology 1600 to fabricate a body element for a roof bow. At a first step 1602, means are employed to create a profile from a substrate to create a body element. Such means can include molding, cutting, blanking, notching, slitting, shearing, extruding, stamping, punching, and/or substantially any suitable process. At 1602, means are employed to form one or more holes in the profile, which can include one or more processes from step 1602, that also include drilling and welding. One or more tabs are means for formed in the profile at 1604 and means for coupling the profile with another profile via the tabs is performed in 1606, accordingly to suitable processes as described herein.

In addition, one or more features and/or apertures can be formed on the first and/or second sections either during the formation of the first or second body elements or during a subsequent operation to create desired profile features. Once the elements are coupled together, they can form a roof bow that can be implemented within a vehicle to provide structural support for a roof and/or ceiling of a vehicle. One advantage of utilizing a roof bow with a particular profile such an accurate shape is to provide additional headroom for a user within the vehicle. A further advantage, is the ability to mount the roof bow to existing side structural support elements without varying their size and/or height.

Figure 17:
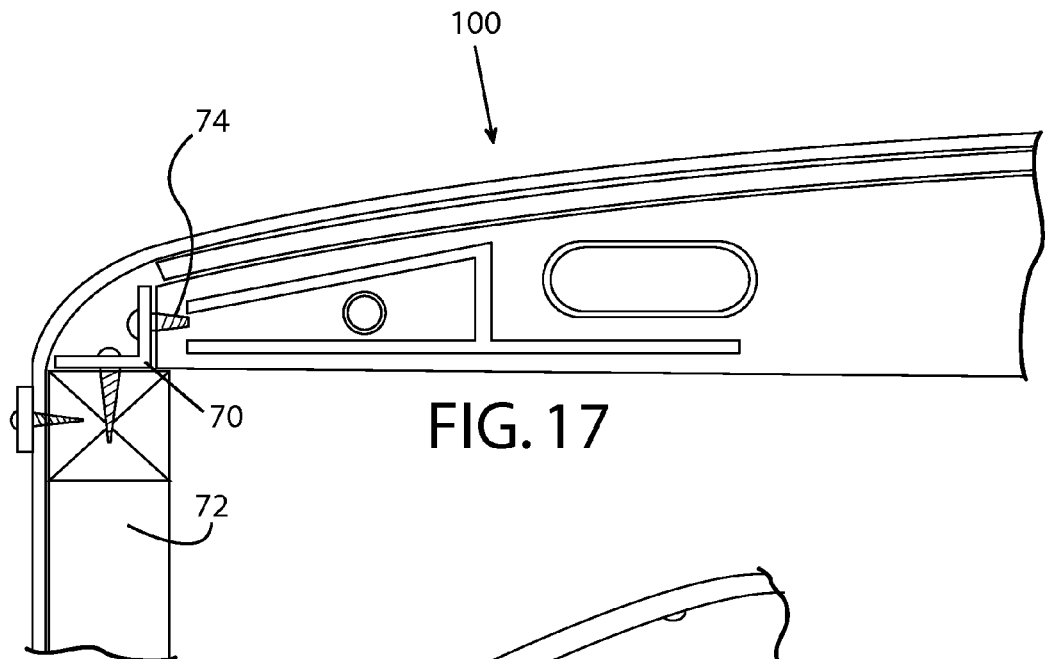
FIG. 17 is a front schematic view of a side of an exemplary roof bow attached to a side wall of a vehicle by an angled connector and fasteners, in accordance with an aspect of the subject invention.
Figure 18:
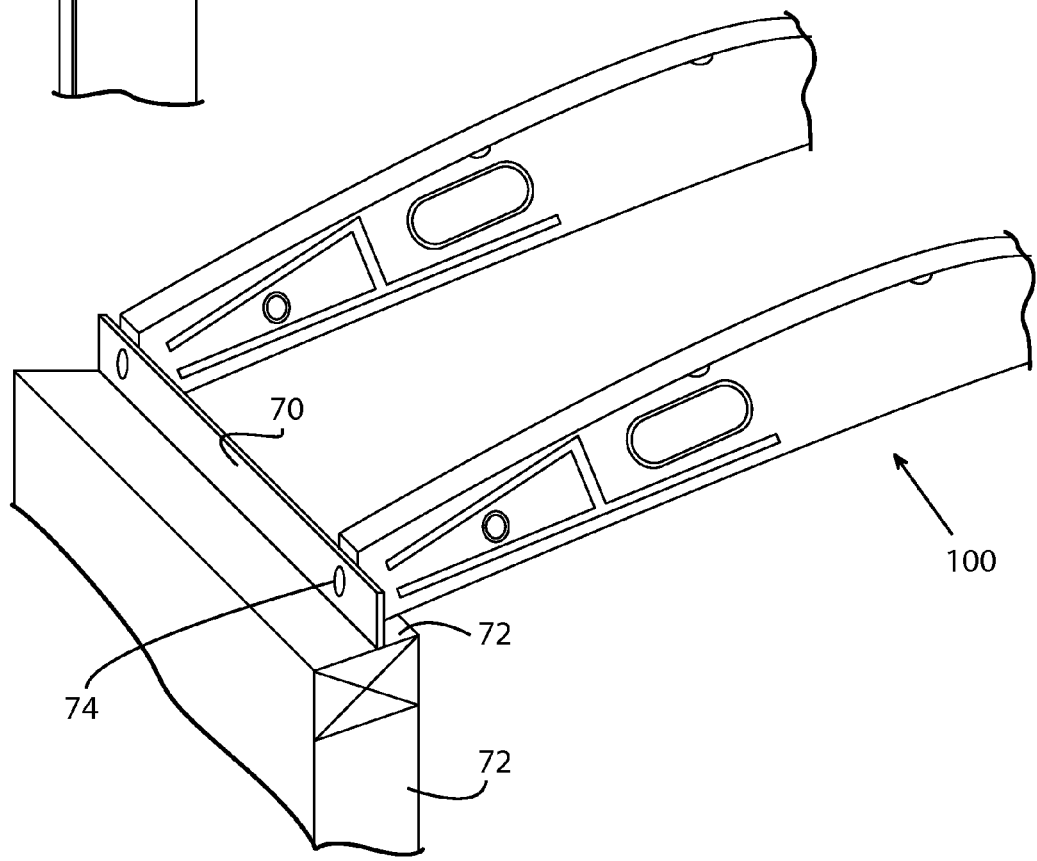
FIG. 18 is a perspective schematic view of two roof bows attached to a side wall of a vehicle by an angled connect of and fasteners.

FIGS. 17 and 18 illustrate the installation of the curved roof bow 100 in a recreational vehicle 26. An angled connector 70 is attached to the top of the vehicle side walls 72. Two angled connectors 70 are, in one embodiment, used for each curved roof bow 100. The curved roof bow 100 is then connected at each end to an angled connector 70 via screws, bolts, or any of a plurality of fasteners 74 or fastening means known in the art. In one aspect, the ends of the curved roof bow 100 rest on the tops of the vehicle side walls 72 when attached.

Figure 21:
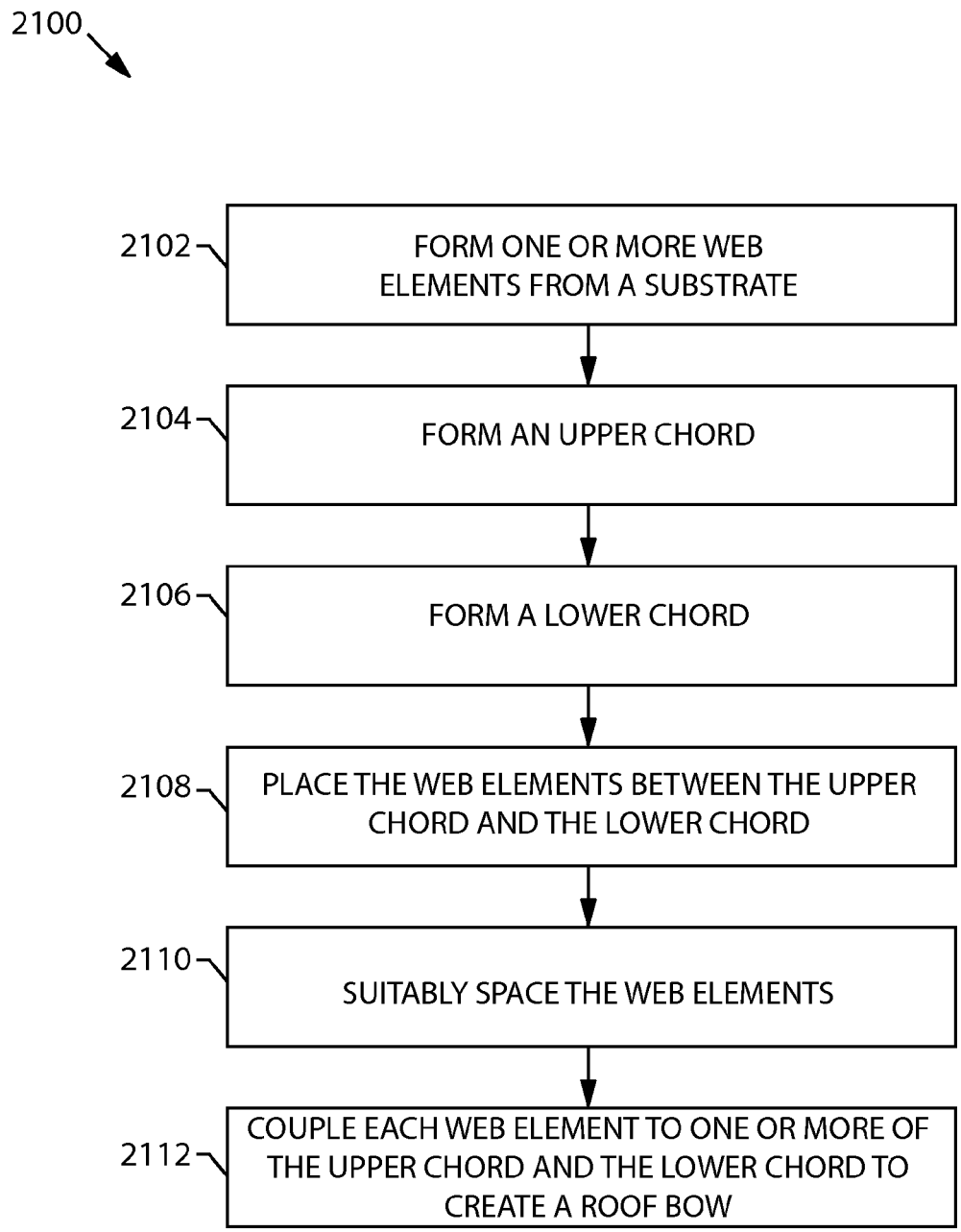
FIG. 21 is an exemplary method to form a roof bow, in accordance with an aspect of the subject invention.

FIG. 21 illustrates a methodology 2100 to create a roof bow using a plurality of web elements. At a first step 2102, one or more web elements are formed from a substrate using any suitable process including molding, cutting, blanking, notching, slitting, shearing, extruding, stamping, and/or punching. The web elements can be substantially any shape or size. At 2104, an upper chord is formed and, at 2106, a lower chord is formed by extrusion or other methods described herein. At 2108, the web elements are placed between the upper chord and the lower chord and suitably spaced at 2110. At 2112, each web element is coupled to at least one of the upper chord and the lower chord to create roof bow such as via clinching or other suitable method. This method allows fabrication of a roof bow without requiring tabs or other features protruding from any of web element.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A method to fabricate a roof bow, comprising:
    forming a first body element from a substrate, the first body element includes one or more tabs;
    forming a second body element from a substrate, the second body element includes one or more tabs;
    clinching the one or more tabs of the first body element to the second body element, wherein the step of clinching includes punching an indent into the one or more tabs of the first body element and an adjacent portion of the second body element;
    clinching the one or more tabs of the second body element to the first body element, wherein the step of clinching includes punching an indent into the one or more tabs of the second body element and an adjacent portion of the first body element;
    clinching an upper chord to a top edge of the first and second body elements, wherein the step of clinching includes punching an indent into the upper chord and an adjacent portion of the first and second body element; and
    clinching a lower chord to a bottom edge of the first and second body elements, wherein the step of clinching includes punching an indent into the upper chord and an adjacent portion of the first and second body element.

2. The method according to claim 1, further comprising forming a round aperture in one or more of the first body element and the second body element.

3. The method according to claim 1, further including forming an oval aperture in one or more of the first body element and the second body element.

4. The method according to claim 1, further comprising forming a rectangular aperture in one or more of the first body element and the second body element.

5. The method according to claim 1, wherein the upper chord is formed by extrusion.

6. The method according to claim 1, wherein the lower chord is formed by extrusion.

7. The method according to claim 1, wherein one or more of the upper chord and the lower chord have a T-shaped profile.

8. The method according to claim 1, wherein the clinching is accomplished via a tog-l-loc.

9. The method according to claim 1, wherein the first body element and the second body element are tapered from a side with tabs to a side distal the side with tabs.

10. The method according to claim 1, further comprising forming plural apertures in one or more of the first body element and the second body element, wherein the plural apertures have rolled edges to provide a smooth perimeter edge.

11. The method according to claim 1, wherein the body elements have a substantially arcuate profile.

12. The method according to claim 1, wherein the body elements have the one or more tabs formed at a widest portion of the body elements.

13. The method according to claim 1, wherein the first body element has a feature on a side distal to the tabs wherein the profile of the body element steps down to the end distal the tabs.

14. The method according to claim 1, wherein the second body element includes a cut out that extends to an outside edge distal the side with the tabs.

15. A method to fabricate a roof bow, comprising:

providing a first body element and a second body element, the first body element and second body element each having a profile including a first end and a second end joined by top and bottom edges, wherein the first body element and the second body element each have a length less than a length of the roof bow;

coupling the first end of the first body element to the first end of the second body element by clinching a portion of the first end overlapping a portion of the second end, wherein clinching includes a step selected from the group consisting of punching an indent into the overlapping portion of the first body element and the overlapping portion of the second body element, driving a fastening element through the overlapping portion of the first body element and the overlapping portion of the second body element, and applying an adhesive, epoxy, or weld to join the overlapping portion of the first body element to the overlapping portion of the second body element;

providing an upper chord and a lower chord, and attaching the upper chord and the lower chord to the first and second body elements; and wherein the upper chord and lower chord are attached to the first and second body elements by overlapping a portion of the upper chord over the top edge of the first and second body elements and overlapping a portion of the lower chord over the bottom edge of the first and second body elements, clinching the overlapping portions of the upper chord and lower chord and first and second body elements, wherein the step of clinching includes punching plural indents in each of the overlapping portions of the upper chord and lower chord, wherein one of the plural indents in the upper chord and the lower chord extends to form a corresponding indent in the first body element and another of the plural indents in the upper chord and lower chord extends to form a corresponding indent in the second body element.

* * * * *